2,774,709

POLYOXYETHYLATED ALKYL PHENOL EMULSIFICATION OF INSOLUBLE HYDROCARBON INSECTICIDES

Raymond L. Mayhew, Phillipsburg, Leslie G. Nunn, Plainfield, and Robert L. Sundberg, Alpha, N. J., assignors to General Aniline & Film Corporation, New York, N. Y., a corporation of Delaware No Drawing. Application November 16, 1953,
Serial No. 392,509

18 Claims. (Cl. 167—42)

This invention relates to emulsification of insoluble liquid hydrocarbons and more particularly to the use of an improved emulsifying agent for producing aqueous emulsions of water-insoluble liquid hydrocarbons.

It is often highly desirable to produce stable aqueous emulsions of liquid water-insoluble hydrocarbons. Such hydrocarbons may or may not have functional agents dissolved therein, as for example, organic biocides. A substantial proportion of the biocides which have found increasing use as agricultural and/or sanitary chemicals are water-insoluble and are accordingly commonly applied in the form of emulsions in water. Generally, the biocide is dissolved in a water-insoluble liquid hydrocarbon to form a concentrate, and the concentrate is then prepared for use by emulsification in water.

In producing such emulsions, the use of various types of surface active agents as emulsifying agents has been proposed. Alkyl phenol polyglycol ether non-ionic surface active agents are among those which have been tried for this purpose. However, a chief disadvantage has been that those polyglycol ethers which contain sufficient ethylene oxide to emulsify mineral oils, kerosene and other water-insoluble liquid hydrocarbons in water are not soluble in the hydrocarbons. This necessitated adding considerable amounts of one or more co-solvents in order to obtain a clear solution of the emulsifier in the hydrocarbon. The co-solvent frequently caused complications. Loss of a volatile co-solvent such as butyl alcohol by evaporation resulted in separation of the incompatible emulsifier. Thermal changes often caused incompatibility as well as subsequent dilution of the mixture with a similar or different solvent. If, on the other hand, only a slight amount of ethylene oxide was incorporated into the alkyl phenol polyglycol ether in order to increase its hydrocarbon solubility, the resulting products did not have the required emulsification efficiency. The compatibility of the mixture of hydrocarbon and emulsifying agent has been of such consequence in some cases that alkyl phenol polyglycol ethers were not used and the mineral oil was emulsified solely by mechanical means. The situation is even more complex when the hydrocarbon contains dissolved therein water-insoluble organic biocides, and/or other functional agents in varying concentrations. In such cases, compatibility of the emulsifying agent with the biocide or other agent is important, in addition to the other factors mentioned above.

It is an object of this invention to provide a stable solution of an improved emulsifying agent in a water-insoluble liquid hydrocarbon which may be readily mixed with water to produce stable emulsions. Another object of this invention is the provision of a stable concentrate comprising a solution of a water-insoluble organic biocide and/or other functional agents and such improved emulsifying agent in a water-insoluble liquid hydrocarbon. Still another object of this invention is the provision of a stable emulsion of a water-insoluble liquid hydrocarbon in water, which hydrocarbon may contain dissolved therein a water-insoluble organic biocide and/or other functional agents. Other objects and advantages will appear as the description proceeds.

The attainment of the above objects is made possible by the instant invention which is based upon the discovery that the condensation product of 3-n-pentadecylphenol with from 3 to 15 moles of ethylene oxide constitutes an improved emulsifying agent effective for producing very stable aqueous emulsions with water-insoluble liquid hydrocarbons.

The above-mentioned condensation product of 3-n-pentadecylphenol with from 3 to 15 moles of ethylene oxide is a mixture of compounds having the formula

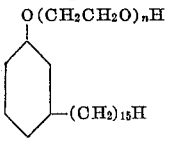

wherein $n$ has a value of from 3 to 15. It will be understood that where $n$ is stated herein and in the appended claims as being a definite value, such value represents the average of the mixture of polyethoxylated compounds produced as a result of the condensation reaction employed for producing same.

The 3-n-pentadecylphenol from which the emulsifying agent employed in the instant invention is derived, may be produced by decarboxylation of anacardic acid obtained for example from cashew nut shell oil by means of a heating treatment, followed by hydrogenation of the unsaturated alkyl group in the meta position. The 3-n-pentadecylphenol may then be polyoxyethylated in known manner by condensation under proper conditions, preferably in the presence of an alkaline catalyst such as potassium hydroxide or sodium hydroxide and heat and pressure, with from 3 to 15 moles of ethylene oxide. General methods for carrying out the oxyethylation reaction are illustrated in U. S. Patent No. 1,970,578. Within the above range, the optimum number of oxyethylene groups contained in the 3-n-pentadecylphenol polyethylenegylcol ether will of course vary in any particular instance depending upon the desired use, concentration, particularly hydrocarbon employed, etc.

The condensation product of 3-n-pentadecylphenol with 6 or 7 moles of ethylene oxide has been found to have the highly desirable property of solubilizing light mineral oil in water when equal parts of mineral oil and emulsifier are employed. The solution is clear enough to easily see through. While it has a very slight haze, it may be termed a transparent emulsion. This emulsifier containing about 7 moles of ethylene oxide has the unique property of being both water soluble and mineral oil soluble. The condensation product of 3-n-pentadecylphenol with 13 moles of ethylene oxide has been found to be an excellent emulsifier for concentrates of DDT in methylated aromatic petroleum oils such as Solvacide (Socony Vacuum Co.) or Velsicol (Velsicol Corp.).

In solubilizing mineral oils such as technical white mineral oils with Saybolt viscosities of from 50 to 75 and specific gravities of from 0.835 to 0.845, 3-n-pentadecylphenol polyethylene glycol ethers having oxyethylene contents constituting about 35 to 55 percent by weight of the compound have been found preferable. In such cases, a minimum of about 2 percent by weight of the emulsifying agent, depending upon its oxyethylene content, should be employed in the emulsifier-mineral oil mixture. Mixtures containing more than 60 percent do not show any improved emulsion stability. Within this range, increased amounts of emulsifier should usually be employed with increasing ethoxy content.

As stated above, the water-insoluble liquid hydrocarbon to be emulsified may contain such functional agents as biocides, textile treating agents, and the like. The term "biocide" is employed herein and in the appended claims to include insecticides, fungicides, bactericides, herbicides, pest-repellants, and the like. Representative biocides are:

| Trivial or Trade Name | Chemical Name |
| --- | --- |
| DDT | 2,2-bis(p-chlorophenyl)-1,1,1-trichloroethane. |
| DDD | 2,2-bis(p-chlorophenyl)-1,1-dichloroethane. |
| 2-4-D and esters | 2,4-dichlorophenoxyacetic acid. |
| 2-4-5-T and esters | 2,4,5-trichlorophenoxyacetic acid. |
| Toxaphene | chlorinated camphene (67–69% Cl). |
| Chlordane | contains 60% of 1,2,4,5,6,7,8,8-octachloro-4,7-methano-3a,4,7,7a-tetrahydroindane. |
| Dilan | 1/3 tech. 2-nitro-1,1-bis(p-chlorophenyl) propane and 2/3 tech. 2-nitro-1,1-bis(p-chlorophenyl) butane. |
| Nicotine sulfate | 1-methyl-2-$\beta$-pyridyl-pyrrolidine sulfate. |
| Dieldrin | contains 85% of 1,2,3,4,10,10-hexachloro-6,7-epoxy - 1,4,4a,5,6,7,8,8a - octahydro - 1,4,5,8 - dimethanonaphthalene. |
| Lindane | 1,2,3,4,5,6-hexachlorocyclohexane (99% gamma isomer). |
| B. H. C | mixed isomers of 1,2,3,4,5,6-hexachlorocyclohexane. |
| C. P. R | 5.5% piperonyl cyclonene, 0.51% pyrethrum, 2.55% rotenone. |
| I. P. C | isopropyl N-phenyl carbamate. |
| Chloro I. P. C | isopropyl-N-(3-chlorophenyl)carbamate. |
| Methoxychlor | 1,1,1-trichloro-2,2-bis(p-methoxyphenyl) ethane. |
| Aldrin | 95% 1,2,3,4,10,10-hexachloro-1,4,4a,5,8,8a-hexahydro-1,4,5,8-dimethanonaphthalene. |
| Parathion | O,O-diethyl-O-p-nitrophenylthiophosphate. |

As exemplary of other uses, one may add oils, fats or waxes to the hydrocarbon-emulsifier mixtures of this invention in the production of pharmaceuticals, ointments, pastes, polishing waxes, cosmetics, hair preparations and the like and are particularly useful when the usual binders, adjuvants and fillers are used in the compositions formulated for specific uses.

Suitable water-insoluble liquid hydrocarbons which may be emulsified in accordance with this invention include aliphatic and aromatic hydrocarbons having a carbon content greater than 6, such as kerosene, mineral seal oil, diesel oil, gas oil, mineral oil, xylene, alkylated benzenes, and alkylated naphthalenes. Generally, when the liquid hydrocarbon contains a functional agent, a highly concentrated solution of the functional agent in the hydrocarbon is first prepared and the required amount, usually from about 1 to 25 percent of the emulsifier by weight of the solution is added. The concentration of the water-insoluble hydrocarbon in the resulting emulsion will of course vary in accordance with the use contemplated, the particular hydrocarbon employed, the presence of functional agents in the hydrocarbon, the oxyethylene content of the emulsifier, and the like. In general, the emulsions will contain from about .01 to 20 percent of the hydrocarbon or concentrate by volume in aqueous emulsion.

The following examples are illustrative of the instant invention and are not to be regarded as limitative. Parts are all by weight unless otherwise indicated.

EXAMPLE 1

Reaction of 3-n-pentadecylphenol with 6 moles of ethylene oxide (emulsifier I below).

589.0 g. (1.938 moles) of 3-n-pentadecylphenol and 2.36 g. of NaOH were charged into an autoclave equipped with a stirrer. 517 g. (11.75 moles) of ethylene oxide gas were continuously passed into the autoclave at 140° C. and about 25 pounds per square inch pressure. The end of the reaction was indicated by a drop in pressure after about 5 hours. 11.06 g. of product was obtained. The mole ratio of the ethylene oxide to 3-n-pentadecylphenol in the product was about 6.0. The product had a varnish color No. 8 and a solidification point of 10° C. The pH of 10% in water was 11.3. It was soluble in both light and heavy mineral oil, the resulting solutions forming stable aqueous emulsions.

EXAMPLE 2

Reaction of 3-n-pentadecylphenol with 13 moles of ethylene oxide (emulsifier IV below).

The procedure of Example 1 was repeated employing 382 g. (1.256 moles) of 3-n-pentadecylphenol, 1.53 g. NaOH and 725 g. (16.48 moles) of ethylene oxide. The reaction was complete after 6⅓ hours. The product had a calculated ethylene oxide to 3-n-pentadecylphenol mole ratio of about 13:1, the color by the varnish system was 6 and the solidification point was 19° C. The cloud point of 6 drops in 10 cc. water was 86° C. and the pH of 10% in water was 11.1. It readily formed stable aqueous emulsions of DDT in xylene or Velsicol.

EXAMPLE 3

Reaction of 3-n-pentadecylphenol with 7 moles of ethylene oxide (emulsifier Ia below).

The procedure of Example 1 was repeated employing 546 g. of 3-n-pentadecylphenol, 1.63 g. of NaOH and 556 g. of ethylene oxide. The final product weighed 11.4 grams and had a solidification point of 10° C. The varnish color number was 7. When mixed in a 1:1 ratio with light mineral oil and poured into water a "solubilized" product was obtained which was only slightly hazy.

EXAMPLE 4

An emulsifiable concentrate was prepared containing 27.8 parts by weight of BHC, 67.2 parts xylene and 5 parts of emulsifier IV. A mixture of 5 cc. of concentrate and 95 cc. of 300 p. p. m. water was emulsified by stirring for one minute with an electric motor. A stable emulsion was produced which showed only a trace of cream and no oil separation after 1 hour and about 3 cc. of cream and no oil separation after 24 hours.

EXAMPLE 5

An emulsifiable concentrate was prepared containing 25 parts DDD, 42 parts xylene, 30 parts Velsicol AR–50 (methylated aromatic petroleum oil) and 3 parts of emulsifier IV. A mixture of 20 cc. of concentrate and 80 cc. of 300 p. p. m. water was emulsified by stirring for one minute with an electric motor. A good non-creaming emulsion was formed which was stable and showed no creaming after one hour. Substantially similar results were obtained when the procedure was repeated using tap water instead of 300 p. p. m. water.

EXAMPLE 6

An emulsifiable concentrate was prepared containing 25 parts DDT, 72 parts xylene, and 3 parts of emulsifier IV. An emulsion prepared as in Example 5 possessed similar outstanding qualities.

EXAMPLE 7

An emulsifiable dormant oil concentrate was prepared containing 98.0 parts Sovaspray #2 (higher purified mineral oil, Socony Vacuum Oil Co.) and 2 parts of emulsifier I. A mixture of 5 cc. of concentrate and 95 cc. of 300 p. p. m. water was emulsified by inverting the mixture in a stoppered 100 cc. graduate ten times. A stable non-creaming hazy emulsion was formed which showed traces of cream and no oil separation after 30 minutes and 1 cc. of cream and no oil separation after 1 hour.

The following table illustrates the superiority of the condensation product of ethylene oxide with 3-n-pentadecylphenol as compared with those derived from closely related alkyl phenols. In the table, emulsifier I is the condensation product of 3-n-pentadecylphenol with ethylene oxide containing 46.5 percent ethylene oxide. Emulsifier Ia is the condensation product of 3-n-pentadecylphenol with ethylene oxide containing 50.3 percent ethylene oxide. Emulsifier II is the condensation product of 6 moles of ethylene oxide with one mole of an alkyl phenol obtained by reaction of tetradecene-1 with phenol in the presence of boron trifluoride and purified by fractional distillation at 160 to 170° C. and 0.5 mm. pressure. This product contains ortho and para alkyl substituted isomers but only negligible amounts of the meta isomer, the alkyl substituents being of the branched chain type. The condensation product contains 46.9 percent ethylene oxide. Emulsifier III is the condensation product of ethylene oxide with an alkyl phenol obtained by reaction of $C_{15}$ to $C_{21}$ polypropylene monoolefins with phenol in the presence of boron trifluoride and purified by fractional distillation to remove dialkyl by-products. Distillation range was 170 to 205° C. at 0.3 to 0.8 mm. pressure. This product also consists almost entirely of ortho and para branched-chain alkyl substituted isomers, and contains 46.7 percent ethylene oxide, corresponding to about 6 moles ethylene oxide per mole of phenol. In each case, formulation A is a mixture of 10 percent emulsifier and 90 percent mineral oil (Saybolt viscosity 50–60) by weight and formulation B is a mixture containing 50 percent emulsifier and 50 percent mineral oil.

The mixtures were evaluated by mixing 5 cc. of each with 95 cc. of 300 p. p. m. water in a stoppered 100 cc. graduate and inverting ten times. The stabilities of the resulting emulsions were checked at 0 minutes, 30 minutes and 24 hours after preparation. The results are shown in the following table:

*Table*

| Emulsifier | Formulation | Appearance of 5% Emulsion After— | | |
|---|---|---|---|---|
| | | 0 Minutes | 30 Minutes | 24 Hours |
| I | A | Stable emulsion | Stable emulsion | Good emulsion, slight separation of cream with some oil at top. |
| | B | do | do | Do. |
| Ia | A | do | do | Good emulsion, slight separation of cream at top. |
| | B | Stable opalescent emulsion. | Stable opalescent emulsion. | Stable opalescent emulsion unchanged after standing 3 months at room temperature. |
| II | A | Poor emulsion, fast creaming. | Poor emulsion, considerable oil at top. | Broken emulsion, considerable oil at top. |
| | B | No emulsion | No emulsion | No emulsion. |
| III | A | Poor emulsion, fast creaming. | Poor emulsion, appreciable oil at top. | Broken emulsion, considerable oil at top. |
| | B | No emulsion | No emulsion | No emulsion. |

The above table demonstrates the superiority of the polyoxyethylated n-3-pentadecylphenols over closely related polyoxyethylated alkyl phenols. Emulsifier I is soluble in mineral oil at 3 percent by weight and in higher concentrations and Emulsifier Ia is soluble at 4 percent by weight, whereas emulsifiers II and III are soluble at 10 percent but insoluble at 5 percent by weight.

What is claimed is:

1. An emulsifiable mixture comprising a water-insoluble liquid hydrocarbon and about 1 to 60% by weight of the mixture of a compound having the formula

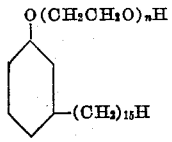

wherein $n$ has a value of from 3 to 15.

2. A mixture as defined in claim 1 in which a water-insoluble organic biocide is dissolved in said hydrocarbon.

3. A mixture as defined in claim 2 in which the biocide is DDT.

4. A mixture as defined in claim 3 in which $n$ has a value of about 13.

5. A mixture as defined in claim 1 wherein said hydrocarbon is mineral oil.

6. A mixture as defined in claim 5 in which $n$ has a value of about 6 to 7.

7. A stable emulsion of the mixture defined in claim 1 in water.

8. A stable emulsion of the mixture defined in claim 2 in water.

9. A stable emulsion of the mixture defined in claim 3 in water.

10. A stable emulsion of the mixture defined in claim 4 in water.

11. A stable emulsion of the mixture defined in claim 5 in water.

12. A stable emulsion of the mixture defined in claim 6 in water.

13. A process for producing a stable aqueous emulsion comprising agitating a mixture as defined in claim 1 in water.

14. A process as defined in claim 13 in which said mixture is present in the emulsion in proportions of about .01 to 20 percent by volume.

15. An emulsifiable mixture comprising about 28 parts by weight of a biocide having a basis of 1,2,3,4,5,6-hexachlorocyclohexane gamma isomer, about 67 parts by weight of an alkyl benzene solvent and about 5 parts by weight of a compound of the formula

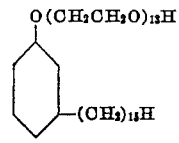

16. An emulsifiable mixture comprising about 25 parts by weight of a biocide having a basis of 2,2-bis(p-chlorophenyl)-1,1-dichloroethane, about 42 parts by weight of an alkyl benzene solvent, about 30 parts by weight of a methylated aromatic petroleum oil, and about 3 parts by weight of a compound of the formula

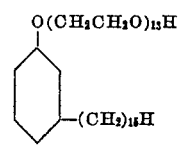

17. An emulsifiable mixture comprising about 25 parts by weight of a biocide having a basis of 2,2-bis(p-chlorophenyl)-1,1,1-trichloroethane, about 72 parts by weight of an aromatic hydrocarbon solvent, and about 3 parts by weight of a compound of the formula
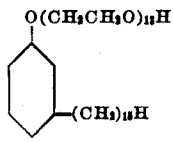
18. An emulsifiable mixture comprising about 98 parts by weight of mineral oil and about 2 parts by weight of a compound of the formula
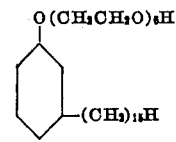
References Cited in the file of this patent
UNITED STATES PATENTS
| | | |
|---|---|---|
| 2,213,477 | Steindorf | Sept. 3, 1940 |
| 2,476,696 | Caplan | July 19, 1949 |
| 2,593,112 | Cross | Apr. 15, 1952 |